Patented June 18, 1935

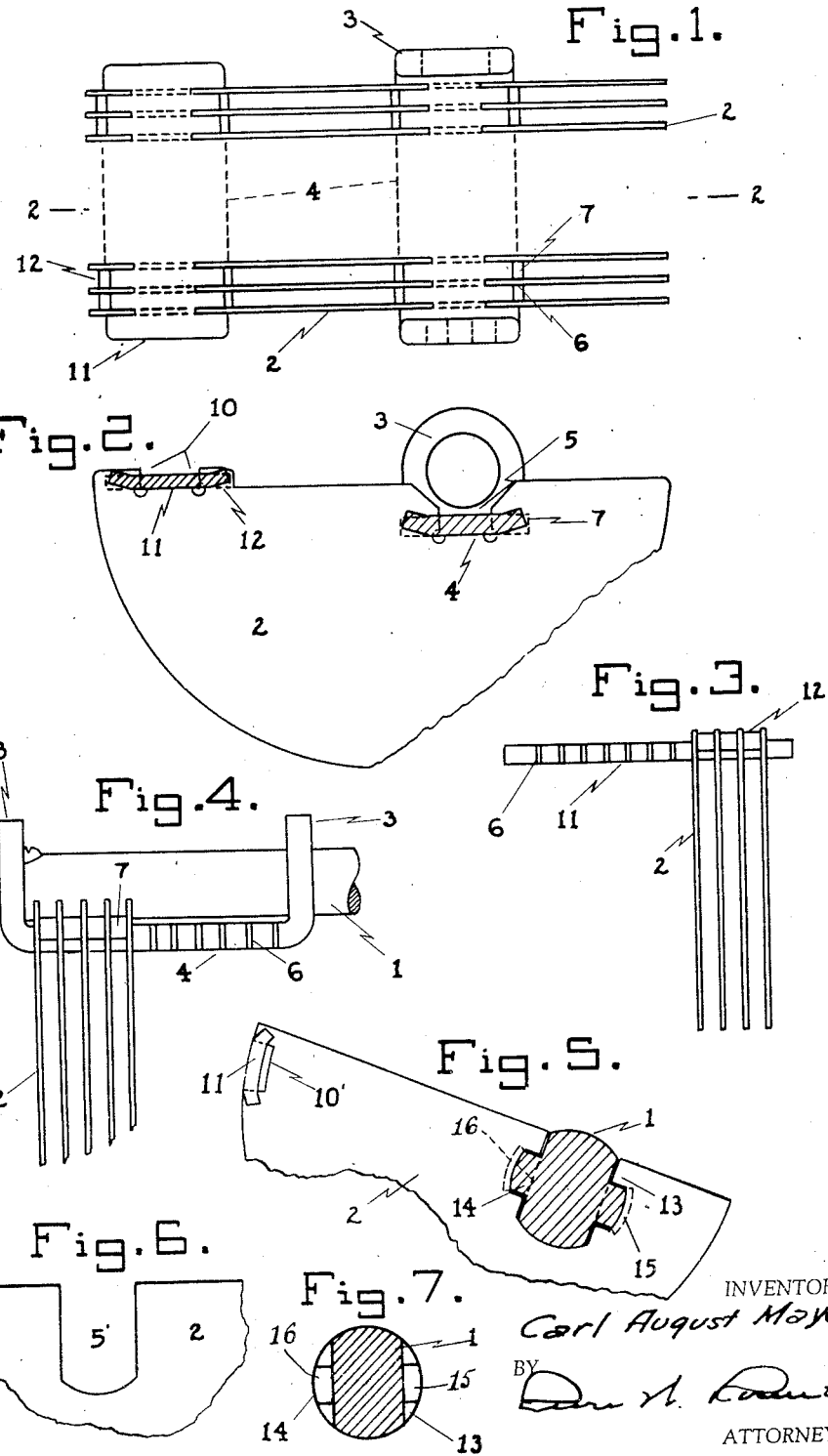

2,005,098

UNITED STATES PATENT OFFICE 2,005,098

VARIABLE CONDENSER

Carl August Mayer, Springfield, Mass., assignor to United American Bosch Corporation, Springfield, Mass., a corporation of New York Application July 6, 1933, Serial No. 679,151

1 Claim. (Cl. 175—41.5)

This invention relates to improvements in electrical condensers; and especially variable condensers of the air insulated type.

Condensers of the kind mentioned usually comprise a number of fixed conductor plates and a corresponding number of plates cooperating therewith and movable with respect to the fixed plates so that the capacity of the condenser can be adjusted. This invention contemplates a novel, efficient and inexpensive method by which the plates of such a condenser and particularly the movable plates can be easily and securely attached to the movable support and retained in proper positions.

The nature and advantages of the invention are set forth in the following description and the novel features are specified in the appended claim; but the right is of course reserved to make any changes that do not depart from the principle of the invention.

On the drawing:

Fig. 1 is a top view showing several condenser plates and the manner in which they are made fast to a movable support;

Fig. 2 is a section on the line 2—2 in Fig. 1;

Fig. 3 is a detail showing several plates in edge view and means for spacing them so as to keep them in position;

Fig. 4 likewise shows in edge view a number of movable plates attached to a rotatable shaft;

Fig. 5 is a view similar to Fig. 2, showing a modified method of mounting and spacing the movable plates of an air insulated condenser;

Fig. 6 shows how said plates are recessed so that they can be engaged with the rotatable shaft which carries them; and Fig. 7 is a cross section of said shaft as it appears before the condenser plates are affixed thereto.

The same numerals identify the same parts throughout.

Referring first to Figs. 1 to 4 inclusive, a rotatable shaft or support is shown at 1 to which are rigidly secured a number of flat conductor plates 2 at predetermined intervals, these plates extending transversely of the shaft and all being parallel to one another. They are attached to the shaft 1 by means of a yoke-shaped element, the arms 3 of which are perforated so that the shaft can pass through them, and the condenser plates 2 are engaged by the portion or base 4 of this yoke connecting said arms. To facilitate rigidly connecting the plates 2 with the yoke, the plates are all recessed as shown at 5. These plates may be of semi-circular or any other suitable form and the recesses 5 are provided preferably in the straight edge thereof to one side of the center of said edge. The base 4 of the yoke has slots 6 in its opposite sides the same distance apart as the spaces between the plates 2. This base is considerably wider than the recesses 5 as shown in Figs. 1 and 2, so that when the plates are engaged with the base 4 of the yoke, the sides of this recess in each plate are received within a pair of said slots. The portions along the sides of the yoke between the slots are indicated by the numeral 7; and when the plates and the yoke are thus fitted together, the portions 7 are bent slightly out of the plane of the base as indicated in Figs. 2 and 4. This bending of the portions 7 has a tendency to make these portions a little thicker, especially at the points where they are connected to the base 4 of the yoke; and thus the metal of the yoke is crowded against the faces of the plates at the sides or edges of the recesses 5 and the plates and yoke are thus securely locked together.

To hold the yoke rigidly on the shaft 1, the metal of the shaft is deformed adjacent one of the arms 3 of the yoke as indicated at 8 so as to make this arm fit the shaft 1 very tightly and prevent any relative movement between the shaft and the yoke. Thus the shaft, yoke and plates are firmly anchored in position with respect to one another; and the yoke element must turn with the shaft and cannot slide along it.

As the plates 2 of this type of condenser are apt to be thin there is always risk that they may be bent somewhat, and to minimize this likelihood an additional spacing member indicated at 11 is attached to the plates. This spacing member may be affixed at any desired point, such as the end of the straight edges of the plates which is farthest removed from the axis of the shaft 1. At this end the straight or upper edges of the plates are recessed as shown at 10, and the member 11 is wider than the recesses 10 but is provided with slots 6, the same as the base portion 4. The member 11 can thus be disposed within the aligned recesses 10 of the plates 2 with the edges of these recesses projecting into the slots 6 so that the portions 12 between the slots can be bent up as before so as to bind this member 11 to each of the plates 2 throughout its length. The plates are thus securely mounted on the shaft 1 and so reenforced by the member 11 that they are all maintained in parallel position. The operation of attaching the plates to the yoke and to the member 11 can be done by a suitable tool which engages all of the parts 7 and parts 12 at once.

In Figs. 1 to 4 inclusive only a few of the movable plates in the condenser are shown, but it will be of course understood that there will be a plate for each pair of slots in the yoke and in the member or element 11.

In Figs. 5, 6, and 7, the shaft 1, as before, occupies an eccentric postion with respect to the plates 2 and at one end these plates are engaged by a slotted member 11 cooperating with recesses 10' as before. The recesses in the plates to receive the shaft 1 are indicated at 5'. This shaft is formed over a portion of its length with four slots or grooves 13 placed equidistantly apart around the circumference of the shaft. When the plates 2 are slipped over this shaft, they are bound thereto by crowding or upsetting the metal 14 of the shaft between the slots 13 so that the metal is forced against the faces of the plates 2 around the edges of the openings or recesses 5'. This is indicated at 15 in Fig. 5, and thus the plates are made rigid with the shaft 1 and the ends which are farthest from this shaft are secured against bending or deformation as before so that their parallel position is always maintained.

With this construction the parts of the rotor of a variable air condenser can be very easily assembled and secured in proper position for their intended use.

While this invention is shown in connection with the movable plates of a condenser, it may obviously be employed for mounting fixed plates also.

The slots or grooves 13 extend only along that part of the shaft 1 in Figs 5, 6 and 7 where the plates are attached to the element 1. The recessses 5' have been shaped as shown particularly in Fig. 6; and the portions 15 of the shaft 1 have cuts indicated in Fig. 7 at 16 across them from one groove 13 to the other on the two sides of the shaft. Hence the shaft 1 and the plates 2 are given the right position by moving the shaft laterally with respect to the plates into the recesses 5'. The sides of these recesses thus pass through the cuts or slots 16 until one portion of the shaft engages the inner ends of the recesses 5'. Then the portions 15 are deformed as indicated in Fig. 5 to bind the plates securely to the shaft 1. The construction and operation described are rendered clear by Figs. 5 and 7, the transverse section through the shaft in Fig. 5 being taken in a plane which passes through the shaft between the cuts 16 and the plane of section in Fig. 7 lying within the cuts 16.

Having described the invention, what is claimed is:

A condenser comprising a supporting member, a rigid yoke thereon, the base of said yoke being parallel to said member and having slots in its opposite edges, conductor plates having recesses, the edges of which are received in said slots, the portions of the base of the yoke between the slots being bent so that the plates are rigidly secured to the yoke.

CARL AUGUST MAYER.